Figure 1:
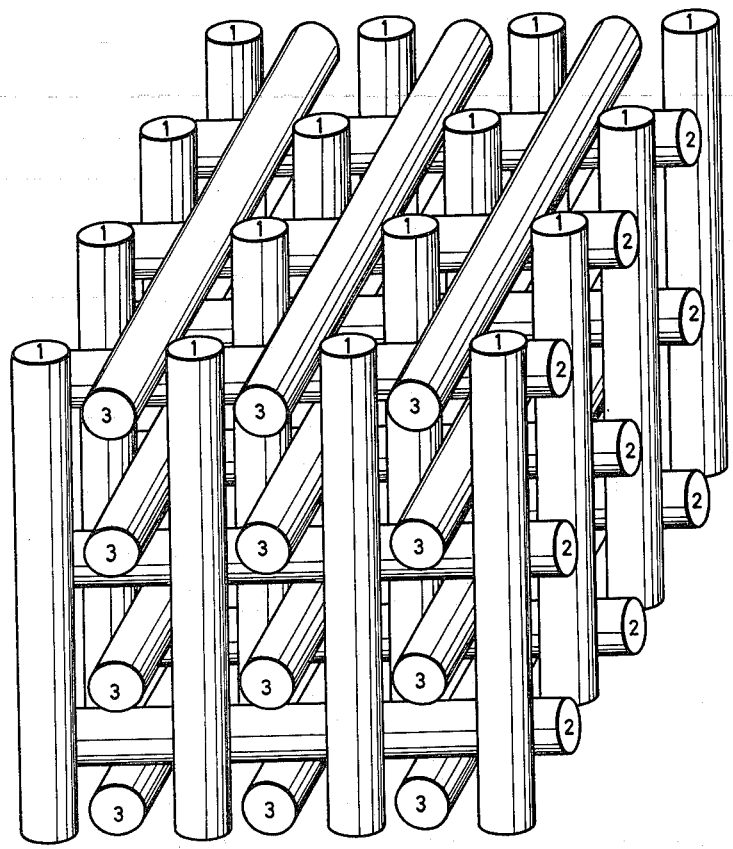

June 18, 1963     W. HUMBACH     3,094,473
FUEL-ROD STRUCTURE FOR HETEROGENEOUS NUCLEAR REACTORS
Filed Oct. 16, 1958     2 Sheets-Sheet 1

June 18, 1963   W. HUMBACH   3,094,473
FUEL-ROD STRUCTURE FOR HETEROGENEOUS NUCLEAR REACTORS
Filed Oct. 16, 1958   2 Sheets-Sheet 2

United States Patent Office 3,094,473
Patented June 18, 1963

3,094,473
FUEL-ROD STRUCTURE FOR HETEROGENEOUS NUCLEAR REACTORS
Walter Humbach, Erlangen, Germany, assignor to Siemens-Schuckertwerke Aktiengesellschaft, Berlin-Siemensstadt, Germany, a corporation of Germany
Filed Oct. 16, 1958, Ser. No. 767,732
2 Claims. (Cl. 204—193.2)

My invention relates to nuclear reactors of the thermal type and more particularly to a fuel-rod assembly for the active core of a heterogeneous reactor.

Thermal reactors require a moderator substance for decelerating the fast neutrons, released by the nuclear fission, down to thermal energies. In homogeneous reactors, the moderator substance is intimately mixed with the nuclear fuel. In heterogeneous reactors, however, moderator and nuclear fuel are kept spacially separate from each other. As a rule, the nuclear fuel consists of rod- or plate-shaped elements which are distributed within the core zone of the reactor in the form of a regular grid or lattice structure. In known lattice structures of such fuel elements, the individual fuel elements extend parallel to one another.

In comparison with homogeneous reactors, those of the heterogeneous type afford a more favorable neutron economy. This manifests itself, among other things, in that, practically, only heterogeneous but not homogeneous reactors can be operated with natural uranium. One of the causes is the more favorable behavior of heterogeneous nuclear fuel systems relative to the parasitic resonance capture of neutrons.

While the high-energy neutrons are being slowed down to thermal energies, they pass through an energy range, the so-called range of resonance, in which they can be most readily captured by the nuclear fuel.

Due to the intimate mixture of nuclear fuel and moderator in homogeneous reactors, the probability that the neutrons to be slowed are located within the nuclear fuel material itself while passing through the decelerating travel, is considerably greater than in heterogeneous reactors. In heterogeneous reactors the moderator separated from the nuclear fuel constitutes, so to say, a channel through which the fast neutrons when being slowed down to thermal energies may by-pass the resonance range of the fuel.

Since no nuclear fission is released during resonance capture, the captured neutrons are lost with respect to the reaction process so that reactor systems, from the viewpoint of neutron economy, operate the more favorably the more heterogeneous they are.

In theory, the ideal heterogeneous reactor consists essentially of a three-dimensional lattice of spherical fuel elements comparable to the arrangement of atoms in a crystal lattice. Such an ideal reactor is heterogeneous in three directions and hence has the most favorable neutron economy. This advantage, however, is obviated in practice by the fact that the heat generated in such a reactor can no longer be dissipated in a technologically and economically justifiable manner and without causing a considerable impairment of the neutron economy by the necessity of inserting structural elements into the reactor structure proper for the purpose of heat dissipation. Besides, such dissipation of heat from the reactor is infeasible at the temperatures technologically of interest.

It is an object of my invention to minimize or practically obviate the just-mentioned difficulties and to provide a heterogeneous reactor which approaches the above-mentioned ideal conditions more closely than heretofore possible.

According to my invention the space lattice structure formed by the fuel elements of a heterogeneous nuclear reactor is formed of at least two component lattice assemblies of which each comprises a number of parallel fuel rods and which are mutually interposed in regular distribution, the direction of the fuel elements in one subassembly extending at an angle, preferably perpendicularly, to the elements of the other subassembly.

According to a preferred embodiment of my invention, the fuel rods of the two subassemblies extend crosswise relative to each other, and the fuel rods of each subassembly are located in a number of mutually parallel planes that extend perpendicularly to the corresponding planes of the other subassembly.

Figure 4:
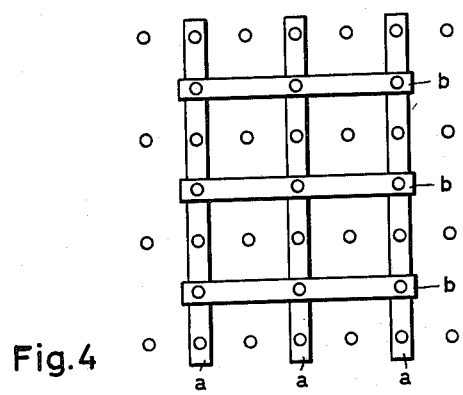
Figure 2:
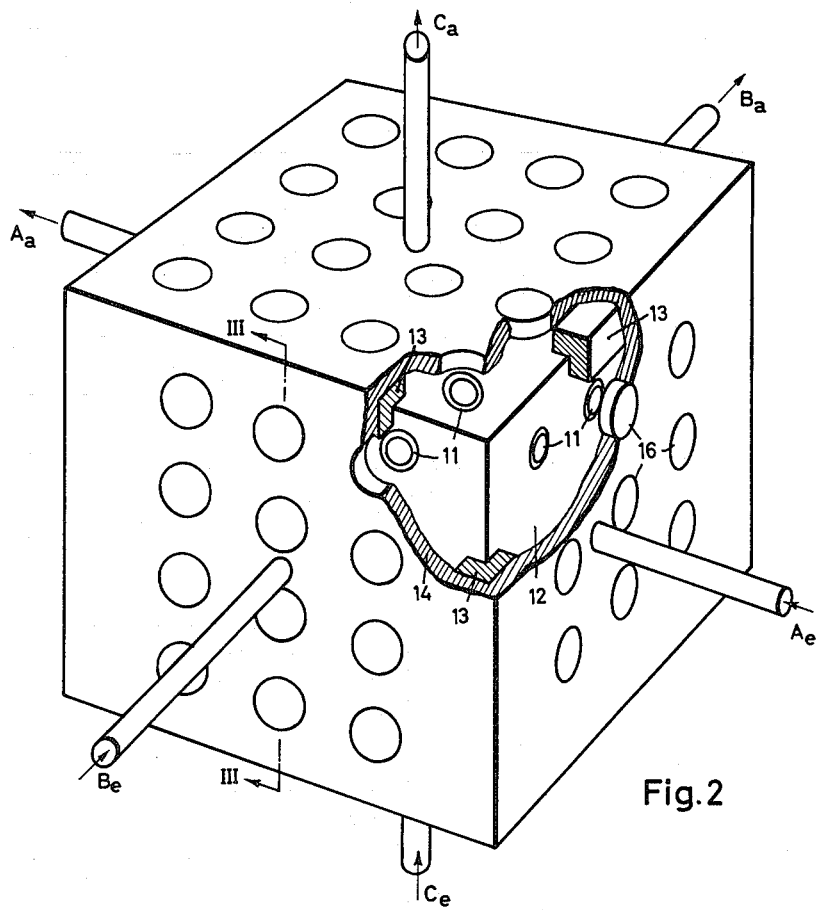
Figure 3:
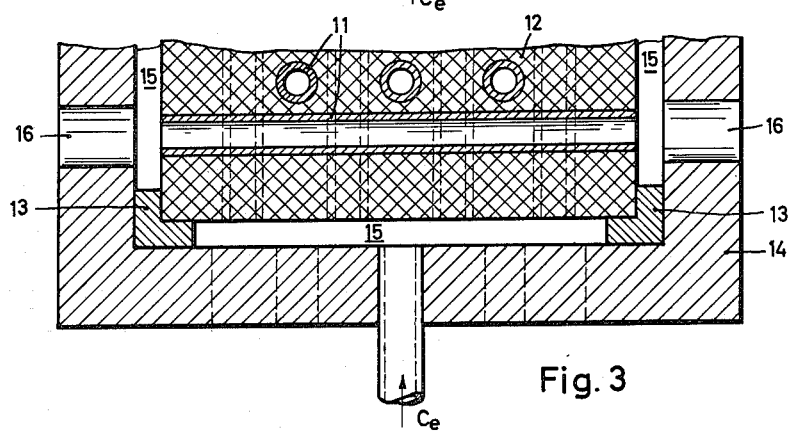

A lattice structure of fuel rods forming a heterogeneous nuclear reactor according to the invention is schematically illustrated by way of example on the accompanying drawing in which FIG. 1 shows a perspective view of the lattice, FIG. 2 shows a perspective and schematic view of a reactor containing the same lattice structure, FIG. 3 is a section along the line III—III of FIG. 2 and FIG. 4 is an explanatory diagram relating to the same core lattice structure.

The illustrated fuel-rod lattice structure comprises a multiplicity of vertical fuel rods 1 which are arranged in a number of parallel, vertical planes, each plane being defined by a multiplicity of individual fuel rods horizontally spaced from each other. The structure further comprises a multiplicity of horizontal fuel rods 2 also arranged in a number of mutually spaced vertical planes. Another group of fuel rods 3 extends horizontally in a number of mutually spaced vertical planes but in a direction perpendicular to those of the fuel rods 1 and 2.

With such a lattice system of fuel rods the heat generated by the nuclear fission can simply be distributed from the nuclear fuel material by disposing the fuel rods of each subassembly individually in a coolant circulation system. Consequently, a heterogeneous reactor provided with a fuel-core structure as shown on the drawing requires three mutually separate or series connected flows of coolant which are spatially related to each other, or which intersect each other, in three different directions in the same manner as the illustrated fuel rods.

To provide for such a cooling system, the fuel rods 11 in the reactor illustrated in FIGS. 2 and 3 have hollow cylindrical shape. They are embedded in a solid moderator 12 formed, for example, by a core structure of graphite. The two ends of each tubular fuel rod 11 lies flush with the surface of the graphite core. The fuel rods consist of natural uranium or slightly enriched uranium. The coolant, consisting of gas such as $CO_2$ or liquid such as water, passes through the channels formed by the hollow rods.

The particular reactor shown in FIGS. 2 and 3 is provided with three separate coolant circulation systems designed as follows. The moderator core 12 is supported by angle pieces 13 in the reactor shell 14. The angle pieces 13 extend along all twelve edges of the cube-shaped core and are joined together at the eight corners of the cube. The moderator core 12, thus supported, forms on each of its six sides an interspace 15 together with the shell 14. Each two mutually opposite interspaces 15 communicate with each other through the one correlated group of fuel rods 11. One of these two spaces serves as a distributing inlet manifold for passing the cold coolant through the system, whereas the other space forms an outlet manifold or collecting space for the heated coolant. Accordingly, the reactor is provided with three inlet pipes $A_e$, $B_e$, $C_e$ for the coolant and with three outlet pipes $A_a$, $B_a$, $C_a$.

The reactor shell 14 has openings closed by respective plugs 16 which have the same thickness as the shell and whose diameter corresponds to the outer diameter of the respective tubular fuel rods. By removing the plugs, the fuel rods are made accessible for exchange.

The operating data of the illustrated reactor are approximately those of the known Calder-Hall reactor. Thus, the entering temperature of the coolant is approximately 140° C., the exit temperature about 340° C., and the operating pressure is approximately 10 to 20 atmospheres. It should be understood, however, that these data as well as the design details and the particular materials mentioned above are presented merely by way of example because the invention proper, as set forth in the claims annexed hereto, permits of being embodied in a great variety of other reactor embodiments.

The fuel-rod lattice structure according to the invention is also of advantage with respect to the optimum requirements for the size of the critical mass. By virtue of the fact that the novel lattice structure most closely approaches the theoretically ideal arrangement of lattice-wise distributed spherical bodies of fuel material, it is superior in various respects to the fuel-rod grid structures heretofore used in reactors of the heterogeneous type.

In order to realize and understand these advantages the following comparison of a core structure according to the invention, such as the one illustrated, with a conventional lattice structure of exclusively vertical fuel rods will be helpful. The novel core structure can be thought to result from the conventional assembly of vertical fuel rods uniformly distributed throughout the core zone, by assuming that the even-numbered rods of the conventional structure, counting in the accompanying drawing from the left to the right and from the rear to the front, are turned 90° relative to the odd-numbered rods. Accordingly, a project involving the provision of a core structure according to the invention, may proceed as follows. At first the projecting engineer drafts a heterogeneous fuel-rod lattice structure of the conventional type with all fuel rods vertical and parallel to each other except that the number and arrangement of the rods is chosen in view of the configuration desired in the ultimate box-type grid to be used. In the case of a box grid structure as shown in FIG. 1, such a tentative grid of parallel rods has the shape apparent from the top view shown in FIG. 4 in which, for explanation, a number of rows or "fields" are indicated at "a" and "b." The fields "a" comprise the rods that, according to the foregoing, are to be turned 90° in one direction relative to the rods outside of both fields "a" and "b." The fields "b" comprise the rods that are to be turned 90° in the other direction. The total number of rods shown is 37 and is identical with the total number of rods in the ultimate box lattice of FIG. 1. The plan-view arrangement of the rods is square.

The heterogeneous starting lattice is then calculated in the usual manner in dependence upon the various parameters, namely the power output, the fuel material used, the moderator used, the absorber material used, the permissible fuel consumption, as if the lattice were to be used in the same manner as in the known reactors. As a result, the values for the length of the rods, the rod radius and the rod spacing are obtained.

Thereafter the transfer to the box-type lattice can be obtained as follows. First the rods of all "a" fields and "b" fields are turned 90° from vertical to horizontal position. This does not affect the lattice dimensions. Thus, the shortest distances between the rods that remained vertical and those now in horizontal position has not been changed and the spacing between the rods has likewise remained the same.

Then, the already horizontal rods of the "b" fields are turned 90° within the horizontal plane, thus producing the box-type lattice according to FIG. 1. Again, the spacing between the "b" rods and the neighboring rods remain unchanged, and the lattice dimensions also remained the same, all changes affecting only the neighbors of any one rod taken in view.

Consequently, the change from the originally assumed and calculated lattice of vertically parallel rods to the box lattice does not affect the data essential with respect to the critical mass, such as the rod spacing and the radius of the rods. Achieved, however, is a greater heterogeneity which is significant for natural-uranium or slightly enriched uranium reactors. In consequence, the proportion of resonance capture of neutrons decreases so considerably that in natural-uranium reactors or in reactors with slightly enriched uranium a reactivity gain in the numerical order of 1% is attained. This improvement manifests itself, particularly in natural-uranium graphite reactors and in natural-uranium heavy water reactors by an appreciable reduction in the required reactor volume and thus also in a reduction of the necessary expenditure in material.

For example, if a graphite reactor has a reactivity value of $k=1.03$, the effect of heterogenization according to the invention affords attaining a reactivity value of about $k=1.04$. Since the volumetric size of a critical reactor is proportional to $1/\sqrt{k-1}$, the linear dimensions of the reactor, for a given power output, can be reduced by a factor in the order of magnitude $\sqrt{0.03/0.04}=0.87$. Consequently the volume of the reactor is reduced by the third power of this ratio, namely by 0.65 times of an otherwise comparable heterogeneous reactor with a core assembly of the conventional type.

For further explanation the following may be added: If one departed from the foregoing assumption that the mutual spacing between the fuel rods and the fictitious rod radius in the novel grid system are the same as in the known arrangement of exclusively vertical rods in optimum distribution, that is if one contemplated a finer sub-division and smaller spacing of the fuel rods, then an increase in critical mass would become necessary because in such a case the resultant system would become more and more similar to the homogeneous type of reactor.

I claim:

1. A fuel-rod lattice structure for heterogeneous nuclear retactors, comprising three component groups of lattice assemblies of fuel rods, each group having parallel fuel rods extending continuously across said lattice structure in a multiplicity of mutually spaced and parallel planes with a multiplicity of mutually spaced fuel rods in each plane, the planes of each group being perpendicular to those of each of the two other groups, and inlet and outlet conduit means providing three series-connected flow paths of coolant in direct contact with said fuel rods, each flow path being parallel to the fuel rods of a different one of said respective groups.

2. A fuel-rod lattice structure according to claim 1, wherein at least some of said flow paths are located within said fuel rods.

References Cited in the file of this patent

UNITED STATES PATENTS

| 2,708,656 | Fermi et al. | May 17, 1955 |
| 2,920,025 | Anderson | Jan. 5, 1960 |

OTHER REFERENCES

Glasstone: "Principles of Nuclear Reactor Engineering," 1955, pages 191–198. (Copy in Lib.)